Feb. 9, 1954 — E. GRANAT — 2,668,941

REVERSIBLE ELECTROMAGNETIC MACHINE

Filed July 17, 1951

INVENTOR
ELIE GRANAT
BY
ATTORNEY

Patented Feb. 9, 1954

2,668,941

UNITED STATES PATENT OFFICE 2,668,941

REVERSIBLE ELECTROMAGNETIC MACHINE

Elie Granat, Paris, France, assignor to Etablissements Saint Chamond-Granat, Paris, France, a corporation of France Application July 17, 1951, Serial No. 237,083

Claims priority, application France May 4, 1951

8 Claims. (Cl. 322—61)

The problems of accurately controlling speeds and positions, such as they present themselves more particularly in the various systems of regulation, telecontrol and the like, recur to solutions including continuous variations in voltage, phase difference or frequency.

All the systems of utilizing electromagnetic machines (direct-current generators, alternator with variable phase difference, and the like) fall against the difficulty inherently arising from the basic material employed, and involving the phenomenon called the hysteresis of laminated iron forming the magnetic circuit.

By examining, for most usual example, the operation of a direct-current generator with variable voltage, it is found out that, because of the hysteresis, for a zero current of excitation, there is maintained a remanent induction flux of different sign, according as the variation in the induction flux has been obtained by varying, in the increasing or decreasing sense, the current of excitation.

The phenomenon would be similar in case of employing a generator with variable phase difference, whose stator would include, for example, a double-phase or polyphase winding fed with direct-current, thus permitting, by varying the value of voltages applied to the excitation of each phase, of shifting the induction flux (as has been described in the previous patents to the applicant). Indeed, because of the remanent induction, with the same values of excitation current in the phases, the remanent flux of excitation will be shifted forwards or backwards according as the move will have been effected in one sense or in the other.

It is thus apparent that only the mode of excitation, utilizing alternating current, permits of doing away with the effects of hysteresis in the magnetic circuits, but in most problems hereinabove referred to the utilization of direct-current for controlling speed and position of drive motors becomes imperative, in view of the particular advantages that presents the employment of the current of this nature.

The object of the present invention is to provide an electromagnetic machine fulfilling the above conditions and in addition suitable for further characteristic utilizations which will hereinafter appear, and accordingly the applicant gives to this machine the name "polydyne," which will be used in the following description.

The "polydyne" comprises three basic parts which are: a stator inductor, an armature rotor carrying a winding divided in several winding parts, and a commutator, the said winding parts being electrically connected with the segments of the said commutator by a special feature, and a set of brushes rotatable around the commutator at any desired angular speed.

The stator inductor is fed with an alternating current provided to give a rotating field inside the "polydyne".

The winding on the armature rotor which can be rotated at any desired angular speed, is divided into "$n$" successive winding parts electrically connected each to the next and each having the same number of turns, and the commutator fixed on the armature rotor has "$pn$" segments, "$p$" being a whole number without decimals, greater than 1. Each successive point of junction of two successive winding parts is connected respectively and in the same order to successive segments of the commutator, each of these segments being in turn electrically connected to a segment which holds on the commutator a rank superior by "$n$" or a multiple of "$n$," to its own rank, so that, for instance, if "$n$"=6 and "$p$"=4, the point connecting the winding parts 6 and 1 being connected with the segment 1, the said segment is connected in turn with the segments 7, 13 and 19.

The values of "$p$" and "$n$" are arbitrarily chosen when designing the "polydyne." The angular speed of the rotor and that of the set brushes can be varied as desired, and preferably one of them can be made zero, and the angular speed of the rotating field can also be varied and made zero if desired.

Accordingly, with a chosen combination of the three above angular speeds, the current collected by the brushes presents characteristics (frequency and phase) of which at least one is different from those of the current that feeds the inducing stator, and by a particular combination, if desired, the said outgoing current can be made direct.

If "$W$" is the angular speed of the rotating field, "$u$" that of the armature rotor, and "$v$" that of the set of brushes, in degrees per second, the frequency "$f$" in hertz of the current collected by the brushes is given by the following general formula:

$$f = \frac{1}{360}(pv - (p-1)u - W)$$

The operation of the "polydyne" and the various methods of its utilization will be more clearly apparent from the following description with reference to the accompanying schematic drawings in which.

The operation will first be explained, in a general way, by referring to the diagram shown in Fig. 1.

Figure 1:
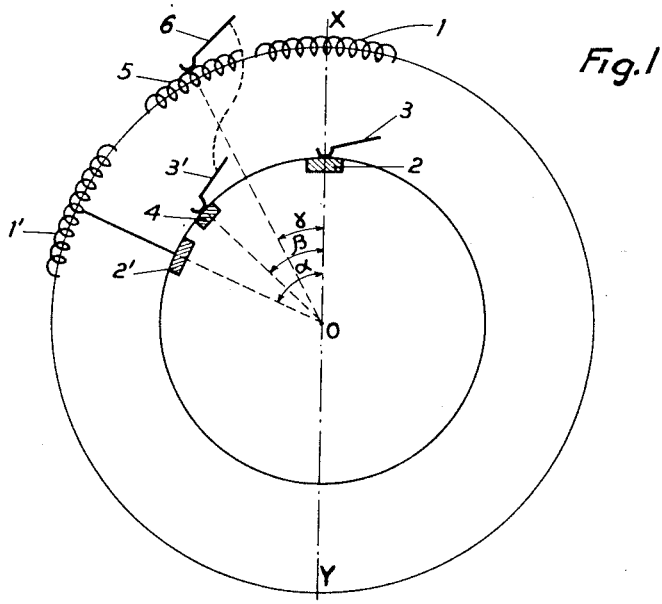
Fig. 1 is a theoretical diagram explaining the operation of the "polydyne"

Taken as starting point of timing is the moment when the winding part 1, the segments 2 electrically connected with the collector, and the brush 3 are all in alignment with XY, as is indicated in Fig. 1.

Denoted by $u$ is the angular speed of rotation of the armature, and by $v$ the angular speed of rotation of the set of brushes, these speeds being expressed for example in degrees per second. By the time $t$, the armature will have turned through the angle $$a = ut$$

and the winding part 1 has moved into $1^1$, while the brush 3 will have turned through the angle $$\beta = vt$$

and will have moved into $3^1$. It then bears against segments 4 of the commutator, electrically connected with the winding part 5 of armature.

The armature winding parts and the commutator segments being uniformly spaced with respect to one another and the commutator having a number of segments $p$ times greater than that of windings, the angular distances between the winding parts $1^1$ and 5, on one hand, and between the segments $2'$ and 4, on the other hand, have the ratio $p$, so that $$a - \gamma = p(a - \beta) \qquad (1)$$

where $\gamma$ is the angle separating the section 5 from the initial line XY.

As the current is gathered under the brush 3 (moved into $3^1$), all takes place as if this current be gathered on a fictitious brush 6 (that may be supposed to be connected permanently to 3) and which would travel not upon the commutator but upon the armature winding parts, in such a way that it would bear at the time $t$ against the winding part 5.

This fictitious brush 6 then would have described the angle $\gamma$ during the time $t$, so that its angular speed $x$ would be given by $$xt = \gamma$$

If the angles in the Formula 1 are then replaced by the speeds proportional thereto, there will be obtained:

$$u - x = p(u - v) \qquad (2)$$

wherefrom $$x = pv - (p-1)u \qquad (3)$$

This formula merely translates the morphology of the "polydyne" in which there are $p$ times as many commutator segments as there are armature winding parts.

From the electrical standpoint, it is known that considering an ordinary bipolar dynamo machine, the voltages produced by induction in the various sections of the armature are apportioned regularly in the space around this armature; if the field is fixed, by causing the brushes to revolve on the collector, or directly on the winding parts of the armature, there will be gathered on these brushes an alternating voltage whose number of periods in a given time will be equal to the number of revolutions effected in the same time by the brushes about the armature. But if the direction of the field is not fixed, if for example the inductor gives rise to a field rotating with constant angular speed W, as it is this field that determines the compartition of the voltages about the armature, the said apportionment will follow the motion of the field and it is to this field that it will be necessary to refer the motion of the brushes.

In the case of a "polydyne," whose inductor will produce a field rotating with speed W, the speed of rotation of the fictitious brushes being $x$, this speed with respect to the field will be $x - W$ and the number of periods of the voltage gathered on these brushes, during the unity of time, will be equal to $(x-W)/360$, and hence the frequency will be $$f = (x - W)/360$$

and referring to the Formula 3:

$$f = \frac{1}{360}(pv - (p-1)u - W) \qquad (4)$$

This is the formula that gives the frequency of the current gathered on the brushes of a "polydyne" in major number of cases.

The voltage on the brushes will depend on the magnitude of the field and the relative speed $u - W$ of the armature rotor with respect to the said field.

Figure 2:
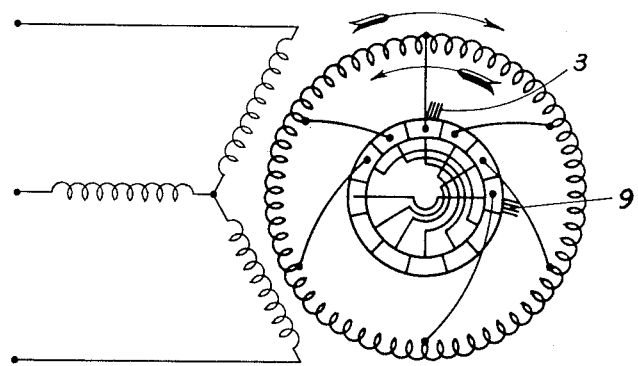
Fig. 2 illustrates the electrical connection of the segments of the commutator in the case where $p=2$.

Fig. 2 shows how the commutator parts will be electrically connected in the particular case where $p = 2$.

The position of the two brushes with respect to each other must be such that at any instant they be electrically connected to two diametrically opposed winding parts; it is therefore easily seen that they must be shifted through $180°/p$. In the case of Fig. 2, where $p=2$, the brushes are at right angle in respect to each other. They would be shifted through $60°$ for $p=3$, and so on.

Figure 3:
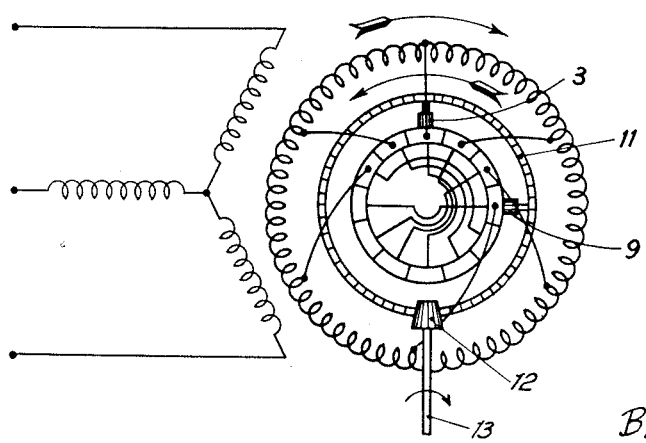
Fig. 3 illustrates the mounting of the set of brushes movable round the collector.

Fig. 3 illustrates the machine shown in Fig. 2, whose brushes 3 and 9 are secured to a movable toothed rim 11 rotatable round the commutator by means of a mechanical transmission constituted by the toothed rim 11 meshing with a pinion 12 actuated by a shaft 13.

The foregoing explanations concerning the general operation of the "polydyne" permit of seeing, without difficulty, what methods should be employed for obtaining such particular results as may be desired. Some of such methods are set forth hereinafter by way of non-limiting examples.

1. The "polydyne" functions as direct-current generator.

Then the current gathered on the brushes is to have no frequency, that is to say that according to the Formula 4 there must be:

$$pv - (p-1)u - W = 0$$

This result may be obtained namely by rendering zero one of the three speeds V, $u$ and W, that is, by rendering immovable one of the elements: set of brushes, armature or field.

(a) A particularly simple solution consists in rendering the brushes immovable. In this case, $v = 0$ and the condition becomes $$W = -(p-1)u$$

The field must therefore rotate inversely in respect to the armature with an angular speed whose absolute value is equal to $(p-1)$ times that of the said armature.

It will be absolutely necessary that this speed ratio is maintained exactly. Should it distinguish itself from this value very slightly, for example by an amount $\epsilon$, there would be obtained an alternating current of frequency $$f = \epsilon/360$$

which current would be of very low frequency, but would be unable to replace a direct-current.

This condition, however, will be easily fulfilled either by driving, through the same motor, the armature and the exciter, for example of three-phase type, feeding the inductor, or by driving them through two motors different from, but subordinated to, each other.

In the case of $p=2$, this way of operation may be obtained by producing the rotating field not by means of a polyphase current, but by means of a single-phase current. Indeed, the single-phase field gives rise to an alternating current that may be considered composed of two rotating fields of half-amplitude and of opposite senses. One of these fields rotating with the speed of the armature and in the same sense will be ineffective, because it does not produce any induction in the armature; the other field, rotating inversely in respect to the armature, will give rise to the induced and commutated voltages, as hereinabove described.

(b) A direct current would also be obtained by rendering immovable the armature; this would correspond to $W=0$, and the condition then would become:

$$pv = W$$

It will therefore be necessary to rotate the brushes on the collector with the speed $W/p$, wherefore only an insignificant amount of energy would be required.

2. The "polydyne" functions as alternator.

The Formula 4 permits of determining the values to be given to the two angular speeds in order to gather on the brushes a current of such frequency as may be desired.

In particular, when a fixed inducing field is utilized ($W=0$) and when the brushes are inmovable ($V=0$), there is obtained $$f = (p-1)\frac{u}{360}$$

$u/360$ representing the number of revolutions per second of the armature.

It may therefore be considered that in this case the "polydyne" functions as frequency multiplier.

If it is desired to obtain a slightly different frequency, it will be sufficient to rotate the brushes with a convenient speed determined according to the Formula 4.

It results from the foregoing description of the fundamental characteristics of the machine and, in particular, of its form illustrated in Fig. 3, that in the particular case of the armature, constituted according to the present invention and located in the fixed field, the phase of the voltage (and hence of the current) gathered under and brush is determined by the position occupied, with respect to the fixed induction flux, by the turns in commutation connected on said brush.

On the other hand, the relative position of the winding parts in commutation is determined by the position of the brushes 3 and 9 on the commutator.

Consequently, any displacement of the brushes by carrying the rim 11 will result in phase difference of the voltage, and hence of the current gathered under the brush.

The machine, object of the present invention, is a reversible machine.

When the machine functions as generator, it is to be noted that, in the case where, on one hand, the stator be supplied with polyphase current and where, on the other hand, the rotor be supplied with direct current, a couple will occur between the fluxes of the stator and rotor that shall be maintained in quadrature owing to the particular construction of both the armature winding and the commutator, permitting always maintaining the turn in commutation in the axis of the induction flux.

Of course, many changes may be effected in the particular forms of the apparatus, described and shown, without departing from the scope of the invention as defined in the appended claims. Thus, for example, there may be used an inductor having more than two poles.

What is claimed is:

1. Reversible electromagnetic machine called "polydyne" because of its ability to convert variously as required, a feeding current into an outgoing current different from the former by its frequency, thereby characterized that it comprises three basic parts of which some operate controllably as required and each independently of the others, the said three parts being: a stator-inductor fed with a suitable current and providing a rotating field of fixed magnitude inside the "polydyne," an armature-rotor rotatable in the said rotating field at any angular speed desired, carrying a winding regularly divided into "$n$" successive winding parts electrically connected each to the next and having each the same number of turns, and a commutator fixed on the armature rotor and having "$pn$" segments ("$p$" being a whole number without decimals greater than 1), each successive point of junction of two successive winding parts being connected respectively and in the same order to successive segments of the commutator, each of those segments being in turn electrically connected to a segment which holds on the commutator a rank superior by "$n$" or a multiple of "$n$," to its own rank, and a set of brushes rotatable around the commutator at any selected angular speed.

2. The method of utilizing a machine defined in claim 1 for creating a current having for its frequency $f$ a determined number of hertz, said method consisting in imparting to the angular speeds expressed in degrees per second: W of the rotating inductive field, $u$ of the armature and $v$ of the brushes, values such as to satisfy the general formula $$f = \frac{1}{360}pv - (p-1)u - W$$

3. The method of utilizing a machine defined in claim 1 for gathering on the brushes a direct current, said method consisting in rendering the brushes immovable, feeding the inductor in a manner to produce a rotating field, and rotating the armature inversely with respect to the field, the absolute values of the speeds being such as to satisfy the articular formula $$W = (p-1)u$$

4. The method according to claim 3, which in the particular case where $p=2$, is carried out by feeding the inductor with a single-phase current.

5. The method of utilizing a machine defined in claim 1 for gathering under the brushes a direct current, said method consisting in rendering the armature fixed, feeding the inductor in a manner to produce a rotating field, and causing the brushes to revolve on the collector in the same sense as the field, the angular speeds of both the brushes and the field being such as to satisfy the particular formula $$pv=W$$

6. The method of utilizing a machine according to claim 1 as frequency multiplier, said method consisting in rendering immovable both the field and the brushes.

7. The method of utilizing a machine according to claim 1 for obtaining a frequency different from that obtained according to the next preceding claim, said method consisting in rendering the field fixed and causing the brushes to revolve on the collector with a convenient speed.

8. The method of utilizing a machine according to claim 1, characterized by that the phase of the current gathered on the fixed brushes is regulated by imparting to the latter an appropriate fixed shifting.

ELIE GRANAT.

References Cited in the file of this patent

UNITED STATES PATENTS

| Number | Name | Date |
| --- | --- | --- |
| 1,616,794 | Granat | Feb. 8, 1927 |
| 1,727,949 | Tanner | Sept. 10, 1929 |
| 1,753,322 | Tanner | Apr. 8, 1930 |